(12) United States Patent
Kim

(10) Patent No.: US 12,128,765 B2
(45) Date of Patent: Oct. 29, 2024

(54) VEHICLE AND METHOD OF CONTROLLING THE SAME

(71) Applicants: Hyundai Motor Company, Seoul (KR); Kia Corporation, Seoul (KR)

(72) Inventor: Jihoon Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 500 days.

(21) Appl. No.: 17/475,828

(22) Filed: Sep. 15, 2021

(65) Prior Publication Data

US 2022/0134878 A1 May 5, 2022

(30) Foreign Application Priority Data

Oct. 29, 2020 (KR) ........................ 10-2020-0142422

(51) Int. Cl.
| | | |
|---|---|---|
| *B60K 35/00* | (2024.01) | |
| *G06F 3/14* | (2006.01) | |
| *G06F 16/27* | (2019.01) | |
| *G06F 40/279* | (2020.01) | |
| *G10L 15/08* | (2006.01) | |
| *G10L 15/22* | (2006.01) | |
| *B60K 35/10* | (2024.01) | |
| *B60K 35/22* | (2024.01) | |

(52) U.S. Cl.
CPC ............... *B60K 35/00* (2013.01); *G06F 3/14* (2013.01); *G06F 16/27* (2019.01); *G06F 40/279* (2020.01); *G10L 15/08* (2013.01); *G10L 15/22* (2013.01); *B60K 35/10* (2024.01); *B60K 35/22* (2024.01); *B60K 2360/148* (2024.01); *G10L 2015/088* (2013.01); *G10L 2015/223* (2013.01)

(58) Field of Classification Search
None
See application file for complete search history.

(56) References Cited

U.S. PATENT DOCUMENTS 11,113,415 B1 * 9/2021 Amico .................. H04W 12/02
2016/0253428 A1 * 9/2016 Hasan ................. G06F 16/9535
707/754

(Continued)

FOREIGN PATENT DOCUMENTS

| KR | 20160008702 A | 1/2016 | |
|---|---|---|---|
| WO | WO-2015103374 A1 * | 7/2015 | ............. G06F 9/451 |
| WO | WO-2022076680 A1 * | 4/2022 | ............... G06F 8/73 |

*Primary Examiner* — Amresh Singh
(74) *Attorney, Agent, or Firm* — SLATER MATSIL, LLP

(57) ABSTRACT

An embodiment vehicle includes an audio video navigation (AVN) device configured to execute an application, a display configured to display a screen of the application, an input device configured to receive a command from a user, and a processor configured to receive a backup command through the input device, in response to the backup command, generate snapshot data of the application being executed, extract a keyword based on the screen displayed on the display, generate metadata corresponding to the snapshot data and including a keyword, receive a restoration command that includes the keyword, the restoration command received thorough the input device, based on the received restoration command, select the metadata including the keyword, and restore data of the application based on the snapshot data corresponding to the selected metadata.

18 Claims, 8 Drawing Sheets

(56) References Cited

U.S. PATENT DOCUMENTS

| | | | | |
|---|---|---|---|---|
| 2017/0097973 A1* | 4/2017 | Iannaccone | ............ | G06F 16/27 |
| 2020/0081930 A1* | 3/2020 | Currimbhoy | ...... | G06Q 30/0251 |
| 2020/0410052 A1* | 12/2020 | Wiegmann | ............ | G06F 40/169 |

\* cited by examiner

| METADATA | SNAPSHOT DATA |
|---|---|
| ⋮ | ⋮ |
| ROUTE, BUSAN, 100KM, VIA ULSAN | Data 1 |
| SETTINGS, 20 ℃, WIND STRENGTH: STRONG, VOLUME: 70 | Data 2 |
| Music, Come together, Beatles, 1:10 | Data 3 |

FIG. 7

|  | METADATA | SNAPSHOT DATA |
|---|---|---|
| USER 1 | SETTINGS, 25.5 ℃, WIND STRENGTH: MEDIUM, VOLUME: 45 | Data 4 |
|  | Music, Come together, Beatles, 1:10 | Data 3 |
| USER 2 | SETTINGS, 20 ℃, WIND STRENGTH: STRONG, VOLUME: 70 | Data 2 |
|  | MUSIC, GOOD DAY, IU, 2:07 | Data 5 |

VEHICLE AND METHOD OF CONTROLLING THE SAME

CROSS-REFERENCE TO RELATED APPLICATIONS

This application claims the benefit of Korean Patent Application No. 10-2020-0142422, filed on Oct. 29, 2020, which application is hereby incorporated herein by reference.

TECHNICAL FIELD

The disclosure relates to a vehicle and a method of controlling the same.

BACKGROUND

Vehicles capable of providing various additional functions are being developed in consideration of user convenience and safety.

Recently, the vehicle may be equipped with an audio video navigation (AVN) device. The AVN device may provide a radio service, an audio service, and a video service to a user for user convenience.

In addition, the AVN device may provide the user with a route to a destination, and may display various control screens related to control of devices installed in the vehicle or screens related to additional functions that can be executed in a navigation terminal on a display.

SUMMARY

The disclosure relates to a vehicle and a method of controlling the same. Particular embodiments relate to a vehicle that backs up data of an application being provided at a specific time point and restores the data of the application that is being provided at the specific time point by using backup data, and a method of controlling the vehicle.

An embodiment of the disclosure provides a vehicle in which a user can intuitively select a snapshot to be used among a plurality of snapshots because metadata is generated based on information displayed on a screen of a display when generating a snapshot of an application and the metadata of the snapshot at a specific time point, and a method of controlling the vehicle.

Additional embodiments of the disclosure will be set forth in part in the description which follows and, in part, will be obvious from the description, or may be learned by practice of the disclosure.

According to an embodiment of the disclosure, there is provided a vehicle including an audio video navigation (AVN) device configured to execute an application, a display configured to display a screen of the executing application, an input device configured to receive a command from a user, and a processor configured to, based on receiving a backup command through the input device, generate snapshot data of the executing application, extract a keyword based on the screen displayed on the display, generate metadata corresponding to the snapshot data and including a keyword, based on receiving a restoration command including the keyword through the input device, select the metadata including the keyword, and restore data of the application based on the snapshot data corresponding to the selected metadata.

The processor may be configured to, based on receiving the restoration command, control the display to display a plurality of the metadata, and in response to the restoration command including a command for the user to select any one of the displayed plurality of metadata, restore the data of the application based on the snapshot data corresponding to the metadata selected by the user.

The processor may be configured to, based on receiving the backup command, capture the screen of the executing application displayed on the display, and control the display to display the captured screen together with the metadata corresponding to the captured screen.

The processor may be configured to control the display to display the plurality of metadata in an order of high frequency of use of the snapshot data corresponding to the metadata.

The processor may be configured to control the display to display the plurality of metadata in an order of high frequency of use of the application corresponding to the metadata.

The processor may be configured to classify the plurality of metadata for each keyword, and control the display to display the plurality of metadata for each classified keyword.

Based on the backup command including a command excluding a specific keyword, the processor may be configured to generate metadata that does not include the specific keyword.

Based on the restoration command being a user's voice command including the keyword, the processor may be configured to select the metadata including the keyword.

The processor may be configured to classify the plurality of metadata for each user who has input the backup command, and select the metadata including the keyword from among metadata corresponding to the user who has input the restoration command.

According to another embodiment of the disclosure, there is provided a method of controlling a vehicle including, based on receiving a backup command through the input device, generating, by a processor, snapshot data of the executing application, extracting, by the processor, a keyword based on the screen displayed on the display, generating, by the processor, metadata corresponding to the snapshot data and including a keyword, based on receiving a restoration command including the keyword through the input device, selecting, by the processor, the metadata including the keyword, and restoring, by the processor, data of the application based on the snapshot data corresponding to the selected metadata.

The method may further include, based on receiving the restoration command, controlling, by the controller, the display to display a plurality of the metadata. The restoring of the data may include, in response to the restoration command including a command for the user to select any one of the displayed plurality of metadata, restoring the data of the application based on the snapshot data corresponding to the metadata selected by the user.

The method may further include, based on receiving the backup command, capturing, by the controller, the screen of the executing application displayed on the display. The controlling of the display may include controlling the display to display the captured screen together with the metadata corresponding to the captured screen.

The controlling of the display may include controlling the display to display the plurality of metadata in an order of high frequency of use of the snapshot data corresponding to the metadata.

The controlling of the display may include controlling the display to display the plurality of metadata in an order of high frequency of use of the application corresponding to the metadata.

The method may further include classifying, by the controller, the plurality of metadata for each keyword. The controlling of the display may include controlling the display to display the plurality of metadata for each classified keyword.

The generating of the metadata may include, based on the backup command including a command excluding a specific keyword, generating metadata that does not include the specific keyword.

The selecting of the metadata may include, based on the restoration command being a user's voice command including the keyword, selecting the metadata including the keyword.

The method may further include classifying, by the controller, the plurality of metadata for each user who has input the backup command. The selecting of the metadata may include selecting the metadata including the keyword from among metadata corresponding to the user who has input the restoration command.

BRIEF DESCRIPTION OF THE DRAWINGS

These and/or other embodiments of the disclosure will become apparent and more readily appreciated from the following description of exemplary embodiments, taken in conjunction with the accompanying drawings, in which:

FIG. 7 is a view for describing an example of classifying a plurality of metadata for each user who inputs a backup command according to an embodiment.

DETAILED DESCRIPTION OF ILLUSTRATIVE EMBODIMENTS

Figure 1:
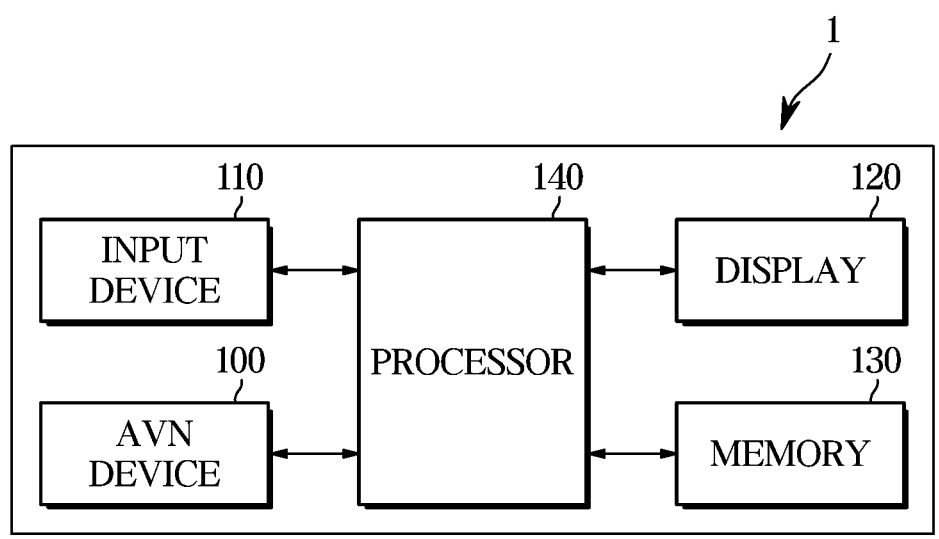
FIG. 1 is a control block diagram of a vehicle according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to the accompanying drawings.

Figure 2:
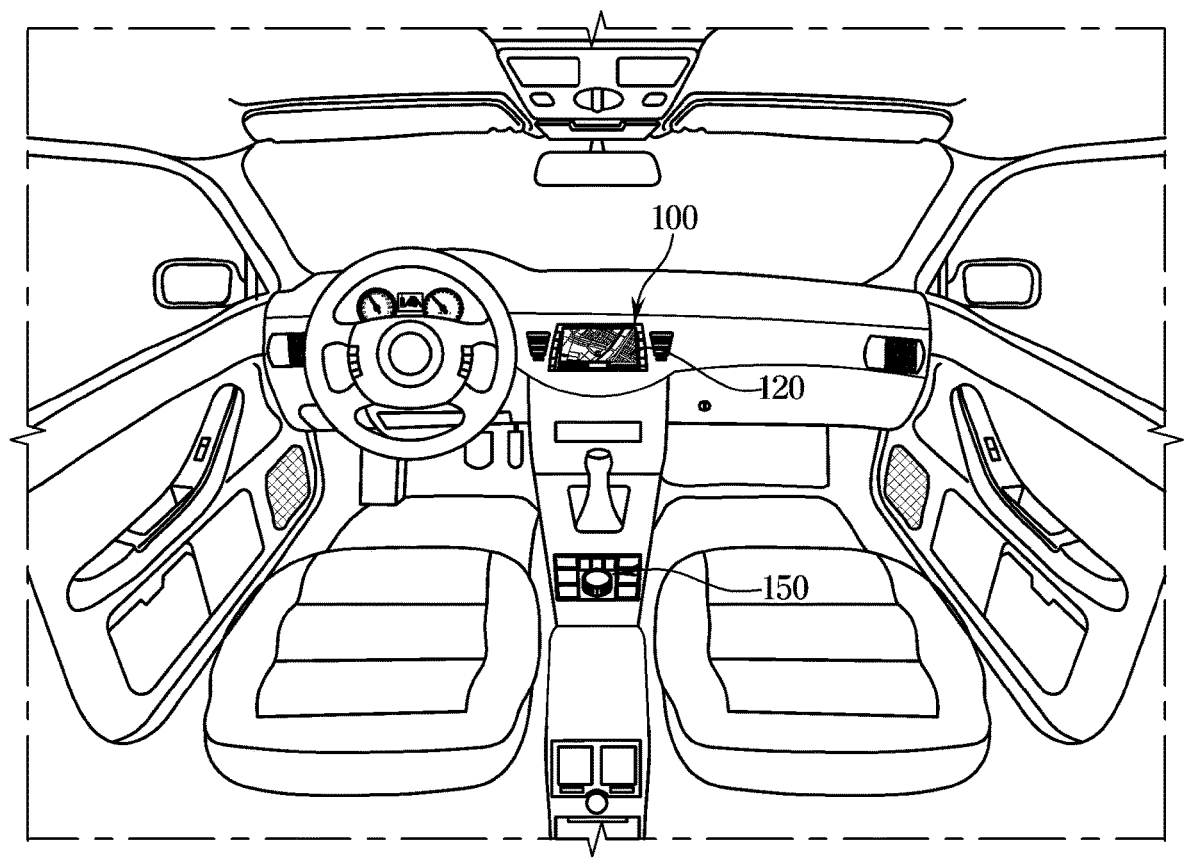
FIG. 2 is a view illustrating an internal configuration of a vehicle according to an embodiment.

FIG. 1 is a control block diagram of a vehicle according to an embodiment, and FIG. 2 is a view illustrating an internal configuration of a vehicle according to an embodiment.

Referring to FIGS. 1 and 2, a vehicle 1 may include an AVN device 100, an input device no, a display 120, a memory 130, and a processor 140.

The AVN device 100 is a device implemented as a single system by integrating audio and video devices, and a navigation device in the vehicle 1, and may provide a radio service for playing a radio based on a terrestrial radio signal to a user in the vehicle 1, an audio service for playing a compact disk (CD), and a video service for playing a digital versatile disk (DVD), a navigation service for guiding a route to a destination to a user, a phone service for controlling whether or not a communication terminal connected to the vehicle 1 receives a call, or the like.

The AVN device 100 may execute various applications. For example, the AVN device 100 may receive a command from the user through the input device no, and may execute applications such as the radio service, the audio service, the video service, the navigation service, the phone service, various control functions related to control of the vehicle 1, and a setting change function that can be executed in the AVN device 100. In addition, the AVN device 100 may be connected to communication terminals such as a mobile phone, a portable multimedia player (PMP), or an MPEG audio-3 (MP3) player, and personal digital assistants (PDAs) through a wired connection method using a USB (universal serial bus) port or a wireless connection method such as a Bluetooth method, and may play audio and video files.

The AVN device 100 may display a screen of an application being executed by the AVN device 100 through the display 120. For example, the AVN device 100 may display a radio screen, an audio screen, a video screen, a navigation screen, a phone screen, various control screens related to control of the vehicle 1, and screens related to setting functions that can be executed by the AVN device 100 through the display 120.

The input device no may be a component for receiving a command from the user. The input device no may include a button provided to receive the command from the user. In this case, the button may be implemented as a hard key type having a mechanical structure, or may be implemented as a soft key type so as to receive the command through a touch input method.

The input device no may be a touch inputter that is displayed on the display 120 provided on the vehicle 1 and can receive the command through a touch input method.

The input device no may be a manipulator 150 provided in a gearbox of the vehicle 1. In this case, the manipulator 150 may include at least one of a knob, a joystick, a lever, a trackball, a manipulation wheel, a motion sensor, an object detection sensor, and a touch sensor.

The input device no may include a voice recognition device capable of receiving a request for a service desired by the user and data corresponding to the service through a user's voice.

As described above, the input device no may receive the user's command through the button or the voice, but may be implemented in any manner as long as it can receive the command from the user.

The input device no may transmit the input command to the processor 140.

A snapshot may be a virtual copy file of data of a specific time point. Therefore, using the snapshot generated at the specific time, the processor 140 may backup the data at the specific time point.

When receiving a backup command from the input device no, the processor 140 may generate snapshot data of the application executing in the AVN device 100.

The snapshot data may be a backup copy of specific data generated at the specific time point. That is, the snapshot data may be backup data for the data of the application executing at a time point the user commanded a backup. In this case, the snapshot data may include at least one of information of the application executing in the AVN device 100, data being used by the application, state information of the application, and parameter values of the application.

When receiving the backup command from the input device no, the processor 140 may extract keywords based on the screen of the application displayed on the display 120. That is, the processor 140 may extract the keywords based on text or symbols displayed on the screen of the executing application.

The metadata may be data about data. That is, the metadata is structured data about data, and may be data that describes other data. The metadata may be data given to information according to certain rules in order to efficiently search data to be searched among a large amount of structured data.

When receiving the backup command from the input device no, the processor 140 may generate the metadata including the keyword extracted from the screen of the application. In this case, the processor 140 may associate the generated snapshot data with the generated metadata and store the generated snapshot data in the memory 130. That is, the snapshot data, which is the backup data generated at the specific time point to which the user inputs the backup command, may be stored in the memory 130 together with metadata generated based on the screen of the display 120 at the specific time point.

The user may input the backup command to the input device no at any time at a desired time, and whenever there is the backup command, the processor 140 may generate the snapshot data and the metadata indicating characteristics of the snapshot data, and may store them in the memory 130 together. That is, a plurality of metadata and the snapshot data generated in this way may be paired and stored in the memory 130.

The memory 130 may store programs that perform the above-described operations and later-described operations. The processor 140 may execute the stored programs. In the case where the memory 130 and the processor 140 are plural, they may be integrated into one chip, or may be provided in physically separate locations. Each memory may include a volatile memory such as a static random access memory (SRAM) and a dynamic random access memory (DRAM) for temporarily storing data. Furthermore, the memory 130 may include non-volatile memory such as a Read Only Memory (ROM), an Erasable Programmable Read Only Memory (EPROM), and an Electrically Erasable Programmable Read Only Memory (EEPROM) for storing control programs and control data for a long time. The processor 140 may include various logic circuits and operation circuits, may process data according to a program provided from each memory, and may generate a control signal according to the processing result.

The user may wish to continue to provide the application that was in progress at the specific time point where the backup command was entered. At this time, the user may input a restoration command to the input device 110, and the processor 140 may restore the application based on the previously generated snapshot data when receiving the restoration command. However, since there may be multiple snapshot data stored in the memory 130, it is necessary to select which snapshot data to use.

The input device no may receive a restoration command including a specific keyword from the user.

The restoration command may include a command indicating a user's intention to restore data and the specific keyword.

When receiving the restoration command, the processor 140 may select the metadata including the specific keyword included in the restoration command from among the plurality of metadata stored in the memory 130.

The processor 140 may restore the data of the application based on the snapshot data corresponding to the metadata selected by the processor 140.

That is, the processor 140 may restore the data of the application at the time point when the snapshot data is generated based on the snapshot data, and may execute the application of the AVN device 100 based on the restored data. As a result, when the user inputs the restoration command including the specific keyword, the processor 140 may successively receive the application of the specific time point that was being executed while the specific keyword is displayed on the display 120.

Figure 3:
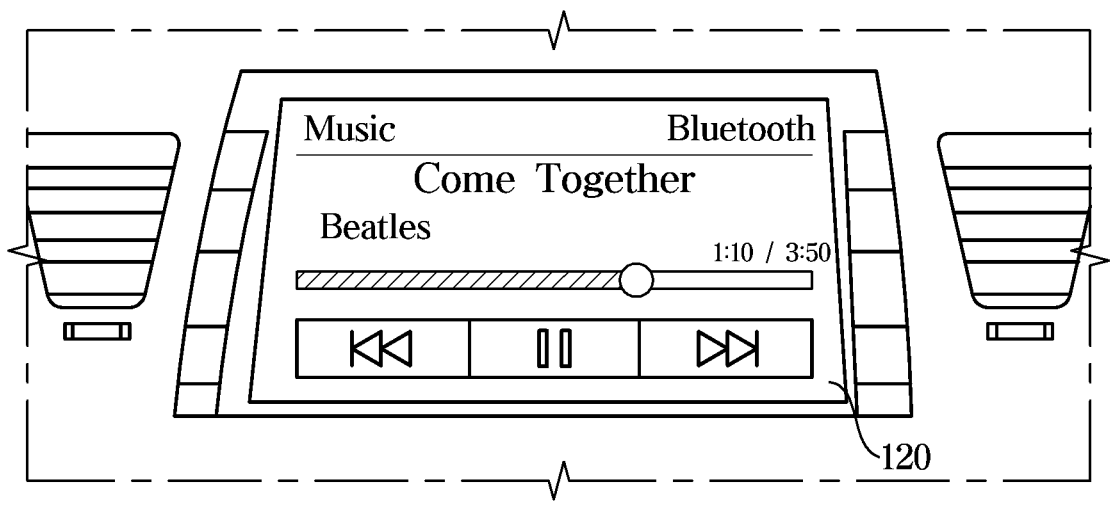
FIG. 3 is a view for describing an example of generating metadata corresponding to snapshot data based on a screen of an application displayed on a display according to an embodiment.
Figure 3:
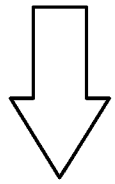

FIG. 3 is a view for describing an example of generating metadata corresponding to snapshot data based on a screen of an application displayed on a display according to an embodiment.

Referring to FIG. 3, the display 120 may display the screen of the application that the AVN device 100 is executing.

For example, when the user was executing the audio service through the AVN device 100, on the screen of the display 120 'Music' as a service type, 'Come Together' as a music title, 'Beatles' as a singer's name, '1:10' as a music playback point, '3:50' as a music playback length, and 'Bluetooth' as a communication method connected to the mobile phone may be displayed.

In this case, when the user inputs the backup command to the input device no, the processor 140 may generate the snapshot data of the application being executed through the audio service. In other words, the processor 140 may generate snapshot data 'Data 3', which is the backup copy indicating information, data, and status of the application being executed at a time point of inputting the backup command such as 'Come Together' for the played music, 1 minute and 10 seconds for the music playback point, and Bluetooth for the communication method connected to the mobile phone.

In addition, when the user inputs the backup command to the input device no, the processor 140 may extract keywords such as 'Music', 'Come Together', 'Beatles', '1:10', and 'Bluetooth', which are texts displayed on the screen of the executing application.

The processor 140 may generate the metadata including the extracted keywords. For example, the processor 140 may generate metadata including the extracted keywords 'Music', 'Come Together', 'Beatles', '1:10', and 'Bluetooth'.

The user may wish not to include certain keywords in the metadata. In this case, the user may input the backup command to the input device 110 by including the command to exclude the specific keyword. For example, when the user inputs the backup command in a voice recognition method and includes the command to exclude the specific keyword such as "excluding snapshot backup and Bluetooth", in the backup command, the processor 140 may generate the metadata based on the keywords other than 'Bluetooth'. In this case, the generated metadata may be 'Music, Come Together, Beatles, 1:10'.

The processor 140 may store the generated metadata "Music, Come Together, Beatles, 1:10" in the memory 130 to correspond to the generated snapshot data "Data 3".

In the future, the user may wish to continue listening to the music "Come Together," which was played at the point of 1 minute and 10 seconds, when the backup command was entered. In this case, the user may include the keyword included in the metadata corresponding to the desired snapshot data in the restoration command and input it to the input device 110.

For example, when the user inputs a restoration command "snapshot restoration, Come Together Listening" by voice into the input device 110, the processor 140 may select the metadata including 'Come Together' that is the keyword included in the restoration command among the plurality of metadata stored in the memory 130.

The processor 140 may restore the data of the application based on the snapshot data corresponding to the selected metadata.

For example, when the processor 140 selects metadata including 'Come Together', 'Music, Come Together, Beatles, 1:10', the corresponding snapshot data may be 'Data 3', which is the snapshot data generated according to the backup command while the user is listening to the music 'Come Together' as the audio service. The processor 140 may restore data of an audio service application that provided the music "Come Together," at the point of 1 minute and 10 seconds based on Data 3. The AVN device 100 may play the music "Come Together" from the 1 minute and 10 second point based on the restored data.

Figure 4:
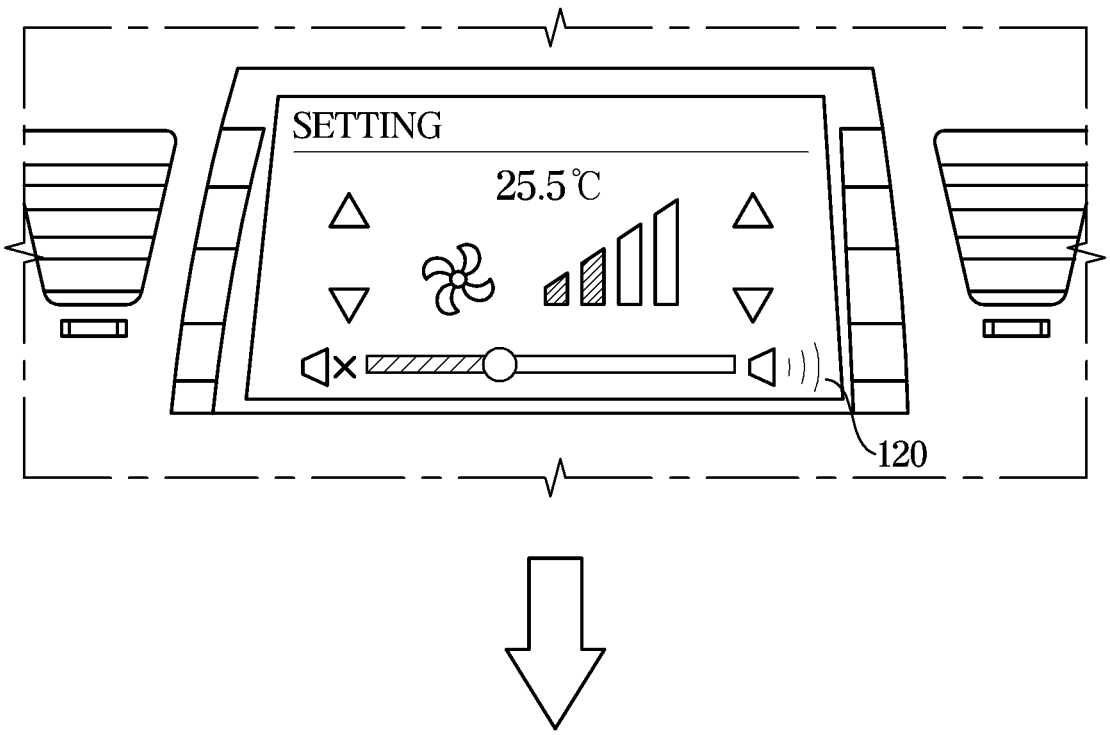
FIG. 4 is a view for describing an example of generating metadata corresponding to snapshot data based on a setting screen displayed on a display according to an exemplary embodiment.

FIG. 4 is a view for describing an example of generating metadata corresponding to snapshot data based on a setting screen displayed on a display according to an exemplary embodiment.

Referring to FIG. 4, the display 120 may display a screen of the setting change function being executed by the AVN device 100.

In this case, when the user inputs the backup command to the input device 110, the processor 140 may generate the snapshot data of the setting change function being executed. That is, the processor 140 may generate snapshot data 'Data 4', which is the backup copy indicating the information, data, and status of the application being executed at the time point of inputting the backup command such as that a set temperature of an air conditioner is 25.5° C., a wind strength is medium, a volume of a speaker is 45, etc.

In addition, when the user inputs the backup command to the input device no, the processor 140 may extract the keywords such as "setting" and "25.5° C.", which are texts displayed on the screen of the executing application. In addition, the processor 140 may extract the keywords such as "wind strength: medium" and "volume: 45", which are indicated by symbols displayed on the screen.

The processor 140 may generate the metadata including the extracted keyword. For example, the processor 140 may generate the metadata including the extracted keywords "setting", "25.5° C.", "wind strength: medium", and "volume: 45". In this case, the generated metadata may be 'Setting, 25.5° C., wind strength: medium, volume: 45'.

The processor 140 may store the generated metadata "setting, 25.5° C., wind strength: medium, volume: 45" in the memory 130 to correspond to the generated snapshot data "Data 4".

When another person uses the vehicle 1 to change the setting of the vehicle 1, the user may want to change the setting of the vehicle 1 again to the setting value previously set by the user. In this case, the user may include the keyword included in the metadata corresponding to the desired snapshot data in the restoration command and input it to the input device no.

For example, when the user inputs the restoration command "snapshot restoration, 25.5° C., setting" into the input device no by voice, the processor 140 may select the metadata including 'setting' and '25.5° C.' which are the keywords included in the restoration command from among the plurality of metadata stored in the memory 130.

The processor 140 may restore the data of the application based on the snapshot data corresponding to the selected metadata.

For example, when the processor 140 selects the metadata including 'setting' and '25.5° C.', 'setting, 25.5° C., wind strength: medium, volume: 45', the corresponding snapshot data may be 'Data 4', which is the snapshot data generated according to the backup command while the user is changing the setting of the vehicle 1. Based on Data 4, the processor 140 may restore data of the setting change function in which a setting value of the set temperature of the air conditioner is 25.5° C., the wind strength is medium, and a speaker volume is 45 has been designated. Based on the restored data, the processor 140 may change the temperature of the air conditioner to 25.5° C., the intensity of the wind to medium, and the volume of the speaker to 45.

Figure 5:
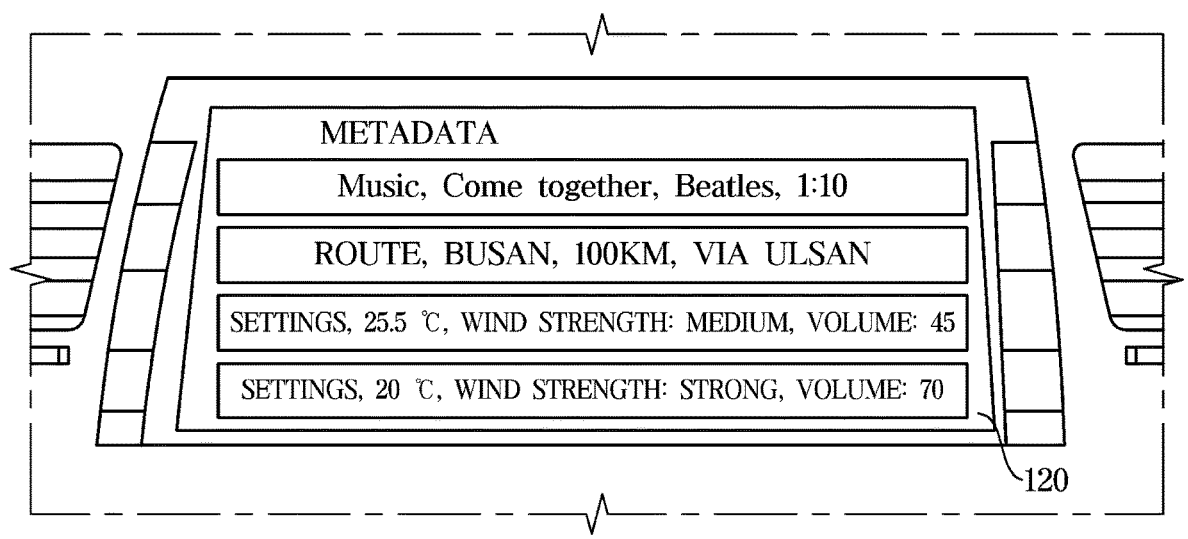
FIG. 5 is a view for describing an example of displaying a plurality of metadata on a display according to an embodiment.

FIG. 5 is a view for describing an example of displaying a plurality of metadata on a display according to an embodiment.

Although the user knows that the desired backup data exists as the snapshot data, the user may not remember specifically contents of the corresponding metadata.

Referring to FIG. 5, when the input device no receives the restoration command, the processor 140 may control the display 120 to display the plurality of metadata. For example, when the user inputs the 'snapshot restoration' into the input device no by voice, or through a button manipulation method to display the stored metadata, the processor 140 may control the display 120 to display the metadata stored in the memory 130.

The user may want to better recognize the contents of the metadata corresponding to the snapshot data that he or she frequently uses.

The processor 140 may control the display 120 to display the plurality of metadata stored in the memory 130 in an order of the frequency of use of the snapshot data corresponding to the metadata.

For example, referring to FIGS. 4 and 5, the snapshot data used by the user may have a high frequency of use in the order of Data 3, Data 1, Data 4, and Data 2. In other words, the user may have ordered the most backup to continue playing the music 'Come Together' from 1 minute and 10 seconds. At this time, the processor 140 may control the display 120 to display the metadata in order of 'Music, Come Together, Beatles, 1:10', 'Route, Busan, 100 Km, via Ulsan', 'Settings, 25.5° C., Wind strength: Medium, Volume: 45', 'Settings, 20° C., Wind strength: Strong, Volume: 70'.

The user may want to better recognize the contents of metadata corresponding to the application that he or she frequently uses.

The processor 140 may control the display 120 to display the plurality of metadata stored in the memory 130 in the order of the high frequency of use of applications corresponding to the metadata.

For example, referring to FIGS. 4 and 5, the application used by the user may have the high frequency of use in the order of the audio service, the navigation service, and the setting change function. At this time, the processor 140 may control the display 120 to display the metadata in order of 'Music, Come Together, Beatles, 1:10', 'Route, Busan, 100 Km, via Ulsan', 'Settings, 25.5° C., Wind strength: Medium, Volume: 45', 'Settings, 20° C., Wind strength: Strong, volume: 70'.

When receiving the backup command, the processor 140 may capture the screen of the application being displayed on the display 120. In this case, the captured screen may be stored in the memory 130 to correspond to the snapshot data and the metadata generated by the processor 140 when the same backup command is received.

When the processor 140 controls the metadata stored in the memory 130 to be displayed on the display 120, the processor 140 may control the display 120 to display the captured screen together with the metadata corresponding to each captured screen.

The user may identify the displayed metadata and select the metadata including the keyword corresponding to the snapshot data that the user wants to restore. In this case, the user may input the restoration command to the input device 110 by including the command for selecting one of the metadata displayed in the restoration command.

For example, the user may input the restoration command by inputting the command to select 'Setting, 25.5° C., Wind strength: medium, Volume: 45' among the metadata displayed on the display 120 to the input device no. At this time, the restoration command including the command to select the metadata may be input through the button or may be input through the user's voice recognition.

When the data of the application is restored through the user's voice recognition, the user may input the voice of 'snapshot restoration, setting at 25.5° C.' into the input device no. In this case, the processor 140 may control the display 120 to display the metadata stored in a state in which the voice is recognized until the 'snapshot restoration'. After identifying a list of metadata displayed on the display 120, the user may input to the input device no by the voice up to '25.5° C. setting', which is the command for selecting desired metadata.

In addition, the user may input the display 120 through the button manipulation method to display the stored metadata. After identifying the list of metadata displayed on the display 120, the user may input the restoration command for selecting the desired metadata through the button manipulation method.

When the processor 140 receives the restoration command including the command for selecting the specific metadata, the processor 140 may restore the data of the application based on the snapshot data corresponding to the metadata selected by the user.

For example, referring to FIGS. 4 and 5, the user inputs the input for selecting metadata such as 'Setting, 25.5° C., Wind strength: medium, Volume: 45' to the input device 110 by the voice recognition or a button input method, the processor 140 may restore the data of the setting change function in which the setting value of which the set temperature of the air conditioner is 25.5° C. and the wind strength is the data of the setting change function in which the setting temperature of the air conditioner to 25.5° C., the wind strength is medium, and the speaker volume is 45 was designated based on 'Data 4', which is the snapshot data corresponding to the selected 'Settings, 25.5° C.'. The processor 140 may change the temperature of the air conditioner to 25.5° C., the wind strength to the medium strength, and the volume of the speaker to 45 based on the restored data.

Figure 6:
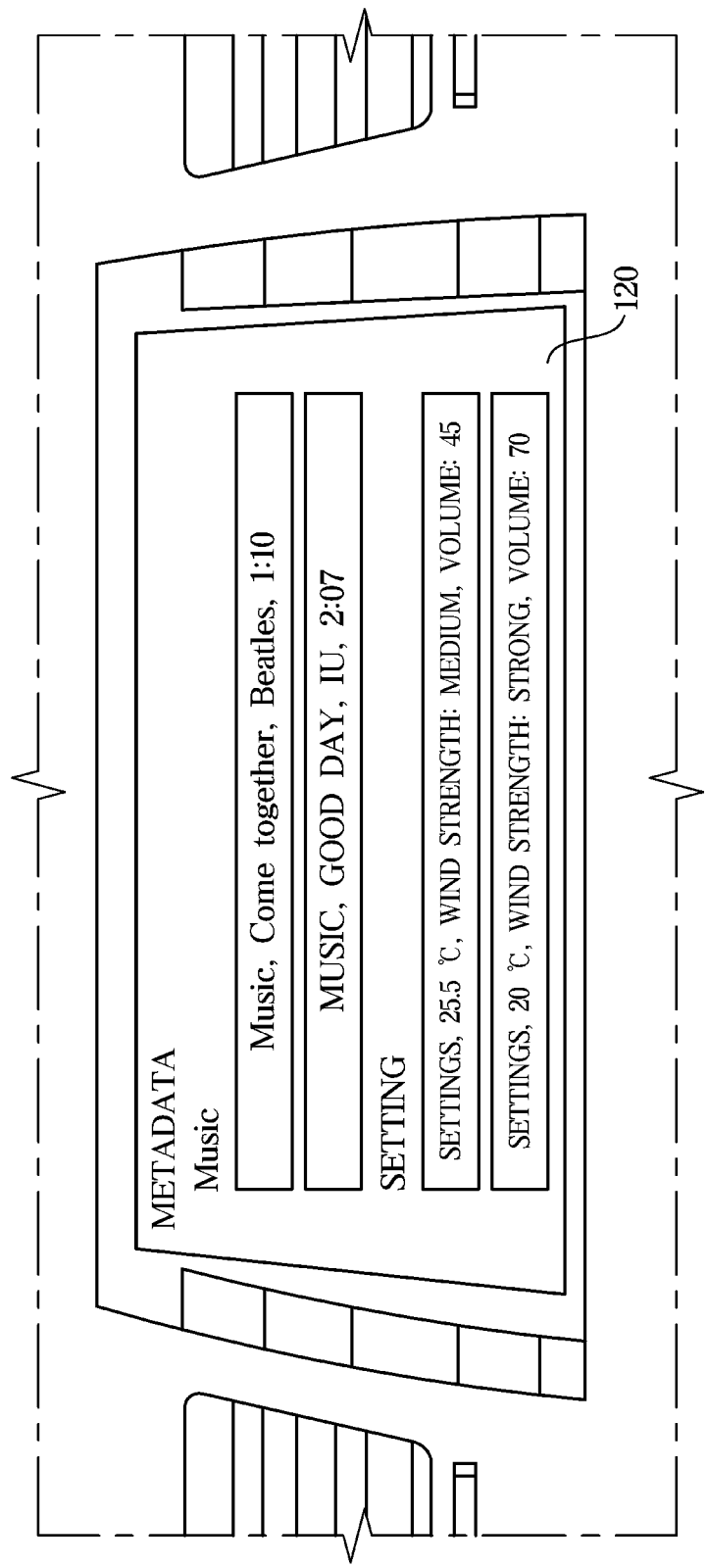
FIG. 6 is a view for describing an example of displaying a plurality of metadata according to classified keywords on a display according to an embodiment.

FIG. 6 is a view for describing an example of displaying a plurality of metadata according to classified keywords on a display according to an embodiment.

Referring to FIG. 6, the processor 140 may classify the metadata stored in the memory 130 for each of the specific keywords.

For example, the processor 140 may classify the metadata into metadata including 'Music' and metadata including 'Setting' as one of the keywords.

Upon receiving the restoration command, the processor 140 may control the display 120 to display the metadata for each classified keyword.

FIG. 7 is a view for describing an example of classifying a plurality of metadata for each user who inputs a backup command according to an embodiment.

Referring to FIG. 7, the vehicle 1 may be used by a plurality of users. At this time, each user may input the backup command to generate the snapshot data that is the backup data that the user wants. In this case, the user who wants to restore data may not want to use the snapshot data generated by other users.

Referring to FIG. 7, the processor 140 may classify the metadata stored in the memory 130 for each user who inputs the backup command to generate each metadata.

For example, the processor 140 may classify metadata and snapshot data generated by User 1 to correspond to User 1, and classify metadata and snapshot data generated by User 2 to correspond to User 2.

When receiving the restoration command, the processor 140 may select the metadata including the keyword included in the restoration command from among the metadata corresponding to the user who has input the restoration command.

For example, upon receiving the restoration command, the processor 140 may determine whether the user who has input the restoration command is the User 1 or the User 2. In this case, the processor 140 may determine who the user who has input the restoration command is through the user's voice recognition.

When the user who entered the restoration command is determined to be User 1, and the restoration command is 'snapshot restoration, setting', which is input through the voice recognition, the processor 140 may select 'Settings, 25.5° C., Wind strength: Medium, Volume: 45', which corresponds to User 1 from among the stored metadata and includes the keyword 'Settings' included in the restoration command.

Figure 8:
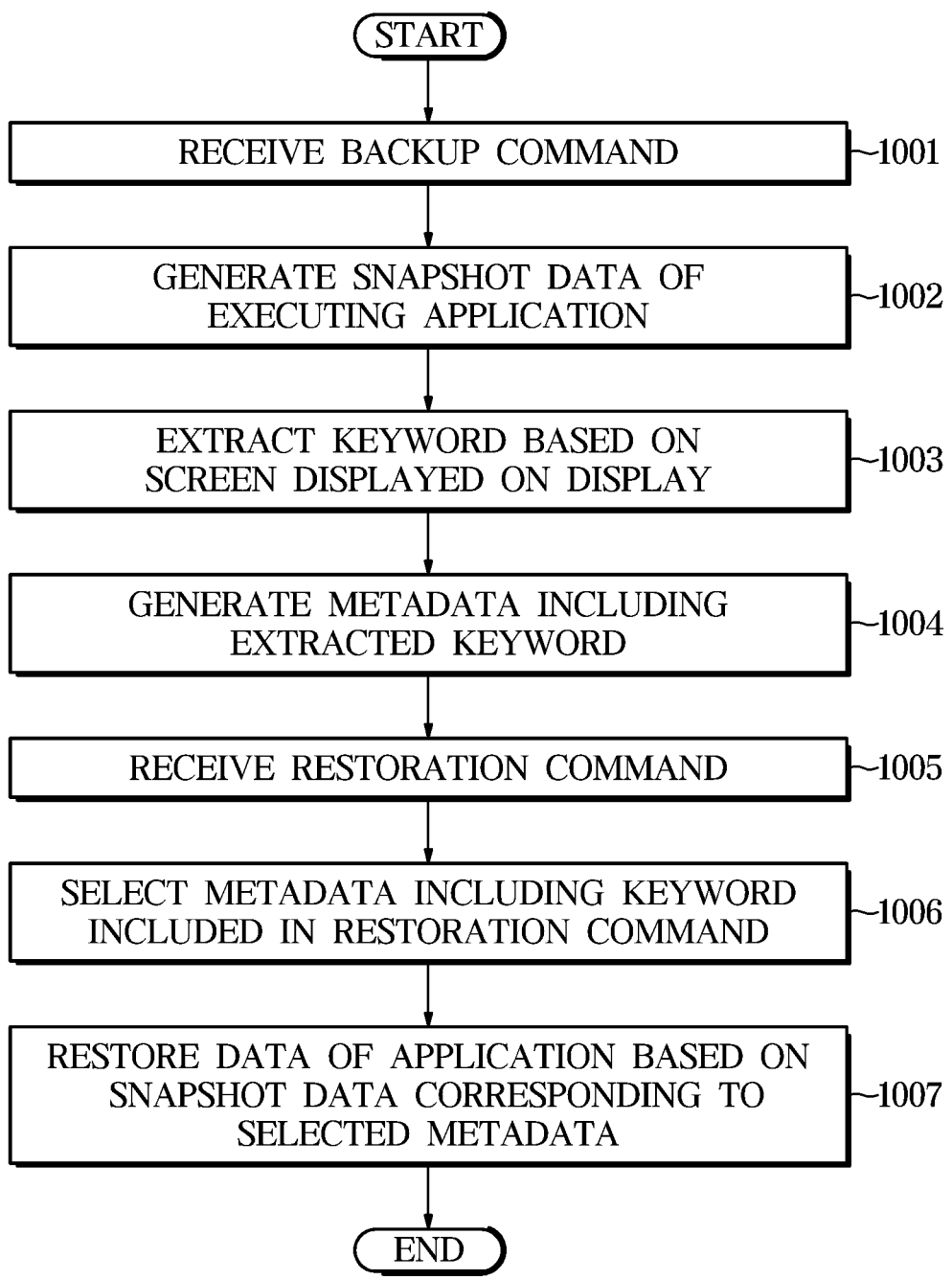
FIG. 8 is a view illustrating a flowchart of a procedure for restoring data of an application according to an embodiment.

FIG. 8 is a view illustrating a flowchart of a procedure for restoring data of an application according to an embodiment. This is only a preferred embodiment for achieving features of the disclosure, and of course, some configurations may be added or deleted as necessary.

Referring to FIG. 8, the input device 110 may receive the backup command from the user (low). The input device 110 may transmit the received backup command to the processor 140.

Upon receiving the backup command, the processor 140 may generate the snapshot data that is the backup data of the application executing in the AVN device 100 (1002). In this case, the processor 140 may store the generated snapshot data in the memory 130.

Upon receiving the backup command from the input device 110, the processor 140 may extract the keyword based on the text or the symbols displayed on the screen of the application displayed on the display 120 (1003).

Upon receiving the backup command from the input device 110, the processor 140 may generate the metadata including the keyword extracted from the screen of the application (1004). In this case, the processor 140 may capture the screen of the application displayed on the display 120 upon receiving the backup command.

When the backup command includes the command excluding the specific keyword, the processor 140 may generate the metadata not to include the specific keyword.

The processor 140 may store the generated metadata in the memory 130 by matching the generated metadata with the generated snapshot data. In this case, the processor 140 may classify the metadata stored in the memory 130 for each specific keyword or user.

The input device 110 may receive the restoration command including the keyword from the user (1005). The input device 110 may transmit the restoration command to the processor 140.

In this case, the processor 140 may control the display 120 to display the plurality of metadata stored in the memory 130 upon receiving the restoration command.

When the backup command is received, the processor 140 may control the display 120 to display the captured screen and metadata corresponding to the captured screen.

The processor 140 may control the display 120 to display the plurality of metadata stored in the memory 130 in the order of the frequency of use of the snapshot data corresponding to the metadata.

In addition, the processor 140 may control the display 120 to display the plurality of metadata stored in the memory 130 in the order of frequency of use of the application corresponding to the metadata.

Also, the processor 140 may control the display 120 to display metadata for each classified keyword.

Upon receiving the restoration command, the processor 140 may select the metadata including the specific keyword included in the restoration command from among the plurality of metadata stored in the memory 130 (1006). Also, upon receiving the restoration command including the command for selecting the specific metadata, the processor 140 may restore the data of the application based on the snapshot data corresponding to the metadata selected by the user.

When receiving the restoration command, the processor 140 may select the metadata including the keyword included in the restoration command from among metadata corresponding to the user who has input the restoration command.

The processor 140 may restore the data of the application based on the snapshot data corresponding to the metadata selected by the processor 140 (1007).

According to the embodiments of the disclosure, it is possible to provide the vehicle capable of generating the metadata of the snapshot based on the information displayed on the display when the user generates the snapshot of the application being used at the specific time point, and restoring the data of the application using the snapshot corresponding to the metadata selected by the user in the future, and the method of controlling the vehicle.

According to the embodiments of the disclosure, it is possible to provide the vehicle in which the user can intuitively select the snapshot to be used among the plurality of snapshots, and the method of controlling the vehicle.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:
1. A vehicle comprising:
an audio video navigation (AVN) device configured to execute an application;
a display configured to display a screen of the application executed by the AVN device;
an input device configured to receive user input; and
a processor configured to:
in response to receiving a backup command from the input device, generate snapshot data of the application being executed and displayed on the screen of the display, the snapshot data comprising:
data being used by the application,
state information of the application,
parameter values of the application, and
screen information being displayed on the screen of the display;
extract a plurality of keywords based on the screen information;
in response to receiving a command from the input device to exclude at least one first keyword among the plurality of keywords, exclude the at least one first keyword from the plurality of keywords to obtain remaining keywords of the plurality of keywords;

generate metadata including the snapshot data and the remaining keywords;
store the metadata in a memory;
in response to receiving from the input device a restoration command and at least one second keyword of the remaining keywords, select the metadata including the at least one second keyword; and
restore, from the memory, the application based on the snapshot data corresponding to the selected metadata.

2. The vehicle according to claim 1, wherein the processor is further configured to:
based on receiving the restoration command from the input device, control the display to display a plurality of the metadata; and
in response to receiving a command to select one of the plurality of the metadata from the input device, restore the data of the application based on the snapshot data corresponding to the selected metadata.

3. The vehicle according to claim 2, wherein the processor is further configured to:
based on receiving the backup command from the input device, capture the screen of the application displayed on the display; and
control the display to display the captured screen together with the metadata corresponding to the captured screen.

4. The vehicle according to claim 2, wherein the processor is further configured to control the display to display the plurality of metadata in an order of high frequency of use of the snapshot data corresponding to the metadata.

5. The vehicle according to claim 2, wherein the processor is further configured to control the display to display the plurality of metadata in an order of high frequency of use of the application corresponding to the metadata.

6. The vehicle according to claim 2, wherein the processor is further configured to:
classify the plurality of metadata for each keyword of the plurality of keywords; and
control the display to display the plurality of metadata for each classified keyword.

7. The vehicle according to claim 1, wherein:
the user input includes a user's voice, and
the processor is further configured to, in response to receiving the user's voice:
recognize the user's voice;
identify the restoration command;
recognize the at least one second keyword from the user's voice; and
select the metadata including the at least one second keyword.

8. The vehicle according to claim 1, wherein the processor is further configured to:
classify the metadata for each user who has input the backup command; and
select the metadata including the at least one second keyword from among metadata corresponding to the user who has input the restoration command.

9. A method of controlling a vehicle, the method comprising:
based on receiving a backup command through an input device, generating, by a processor, snapshot data of an application executed by an audio video navigation (AVN) and displayed on a screen of a display of the vehicle, the snapshot data comprising:
data being used by the application,
state information of the application,
parameter values of the application, and
screen information being displayed on the screen of the display;
extracting, by the processor, a plurality of keywords based on the screen information;
in response to receiving a command from the input device to exclude at least one first keyword among the plurality of keywords, excluding the at least one first keyword from the plurality of keywords to obtain remaining keywords of the plurality of keywords;
generating, by the processor, metadata including the snapshot data and the remaining keywords;
storing the metadata in a memory;
receiving, by the processor, a restoration command and at least one second keyword of the remaining keywords through the input device;
selecting, by the processor, the metadata including the at least one first keyword; and
restoring, by the processor and from the memory, the application based on the snapshot data corresponding to the selected metadata.

10. The method according to claim 9, further comprising, in response to receiving the restoration command from the input device, controlling, by the processor, the display to display a plurality of the metadata.

11. The method according to claim 10, wherein restoring the data comprises, in response to receiving the restoration command and a command to select one of the plurality of metadata from the input device, restoring, by the processor, the data of the application based on the snapshot data corresponding to the selected metadata.

12. The method according to claim 11, further comprising, in response to receiving the backup command from the input device, capturing, by the processor, the screen of the application displayed on the display.

13. The method according to claim 12, wherein controlling, by the processor, the display comprises controlling the display to display the captured screen together with the metadata corresponding to the captured screen.

14. The method according to claim 11, wherein controlling, by the processor, the display comprises controlling the display to display the plurality of metadata in an order of high frequency of use of the snapshot data corresponding to the metadata.

15. The method according to claim 11, wherein controlling, by the processor, the display comprises controlling the display to display the plurality of metadata in an order of high frequency of use of the application corresponding to the metadata.

16. The method according to claim 11, further comprising classifying the plurality of metadata for each keyword, wherein controlling, by the processor, the display comprises controlling the display to display the plurality of metadata for each classified keyword.

17. The method according to claim 9, wherein selecting the metadata comprises, in response to receiving a user's voice:
recognizing, by the processor, the user's voice;
identifying the restoration command;
recognizing, by the processor, the at least one second keyword from the user's voice; and
selecting, by the processor, the metadata including the at least one second keyword.

18. The method according to claim 9, further comprising:
classifying, by the processor, the metadata for each user who has input the backup command; and selecting, by the processor, the metadata including the at least one second keyword from among metadata corresponding to the user who has input the restoration command.

\* \* \* \* \*